Jan. 10, 1939.  F. CAVALLO  2,143,120
CONTINUOUSLY VARIABLE CHANGE SPEED GEAR
Filed July 30, 1937  3 Sheets-Sheet 1
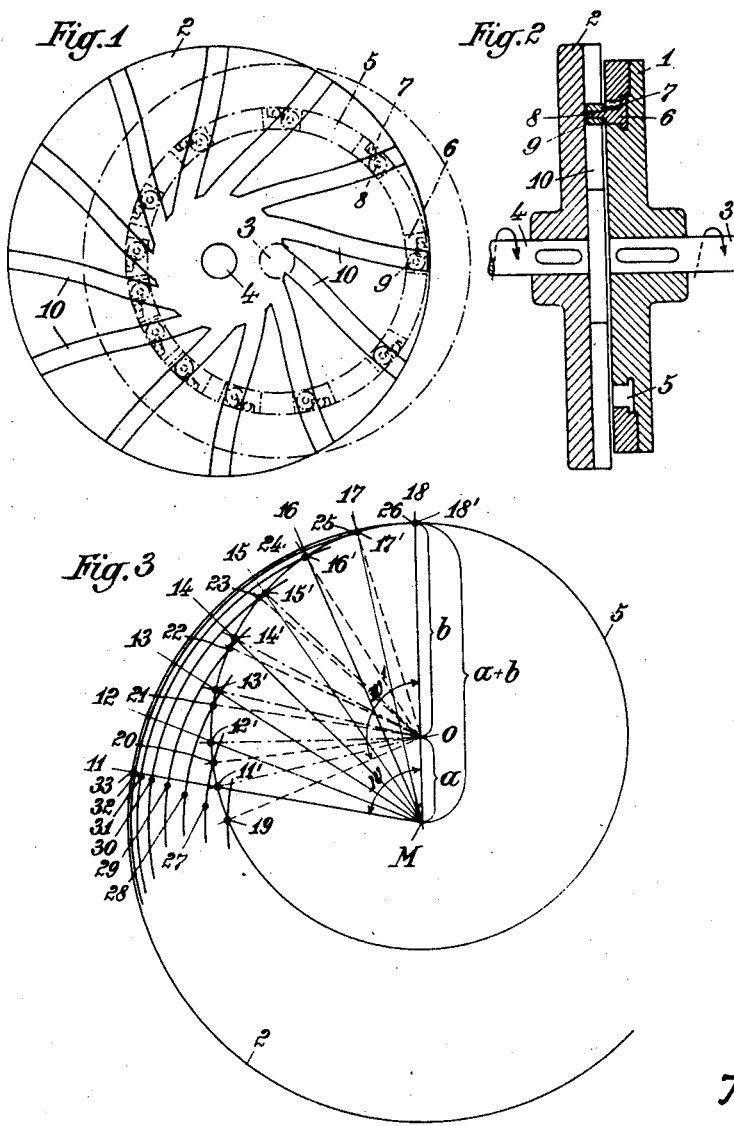
Inventor:
Friedrich Cavallo.

Inventor:

Patented Jan. 10, 1939

2,143,120

UNITED STATES PATENT OFFICE 2,143,120

CONTINUOUSLY VARIABLE CHANGE SPEED GEAR

Friedrich Cavallo, Berlin, Germany

Application July 30, 1937, Serial No. 156,442
In Germany April 4, 1935

3 Claims. (Cl. 74—112)

The invention relates to improvements in the known change speed gearing giving a continuous alteration in the transmission ratio and consisting of two discs adjustable with respect to one another so as to vary the relative eccentricity. One of these discs is provided with an annular groove accommodating ratchet-like members whereas the other disc is provided with guide grooves extending radially in which engage pins provided on the ratchet-like members for coupling the two discs together. The mode of operation of such a gear mechanism is known. If the two discs are so adjusted that they are coaxial then they rotate at the same speed. All the ratchet-like members are in driving engagement. If the discs are arranged eccentrically, then the speeds of the two discs are different. The two discs are coupled only by one ratchet member, namely by that which imparts the greatest angular speed to the driven disc.

Due to the finite number of ratchet members, each ratchet member has at eccentrically set discs to take over the transmission of power along a certain path which is dependent upon the number of ratchet members. Along this path, the ratchet member remains rigidly connected with the annular groove disc. As however the distance of the ratchet member from the centre of the guide groove disc varies continuously there is an alteration in the speed of the driven disc during this variation assuming that the driving disc has a constant speed. The speed of the driven disc then fluctuates between an upper and a lower value. The speed is smallest at the beginning and at the end of the path, i. e., at the beginning and end of the driving engagement of the ratchet member imparting the drive at any time. The maximum value of the speed is reached at the centre of the path. Thus when a new ratchet member comes into engagement there is an acceleration of the driven shaft, whereas after the maximum speed has been obtained there is a retardation until the engagement of the next ratchet member in the direction of rotation. These constant accelerations and retardations involve a considerable unsteadiness in the gearing which may give rise to vibration. This vibration becomes apparent in considerable noise and moreover involves a considerable wear.

A further disadvantage of the known mechanism of this kind is the necessity for transmitting the entire torque by way of one ratchet member. Consequently each ratchet member must be constructed so as to be capable of withstanding the maximum torque so that the mechanism becomes large and expensive.

According to the invention the disadvantages of the known mechanism are avoided by a particular oblique positioning and/or curvature of the radially extending guide groove, whereby a constant speed of the driven disc is obtained for a constant speed of the driving disc and a constant eccentric setting.

The guide grooves are moreover so constructed that a plurality of ratchet devices participate in the transmission of power, i. e., a number of ratchet devices impart the same constant speed to the driven disc.

A particularly advantageous course of the curve can according to the invention be obtained by simultaneously shifting the axes of the coupling pins of both discs somewhat in outward direction.

The invention also relates to the connection between the change speed gearing and a differential gear. According to the invention the non-stationary, i. e., the adjustable disc in the gearing is so arranged that this disc can be driven by means of toothed wheels. For this purpose the axis of the non-stationary disc of the gearing is so arranged on the drive shaft of the differential gear, that it, and simultaneously the disc may be swung about the shaft.

The invention will now be described with reference to the accompanying drawings.

Fig. 1 is a side view of the disc with the guide grooves, the corresponding disc with the annular groove being shown in broken lines.

Fig. 2 is a cross-section through the mechanism with the discs positioned coaxially.

Fig. 3 shows the manner in which the guide grooves of Figs. 1 and 2 are obtained.

Figure 5:
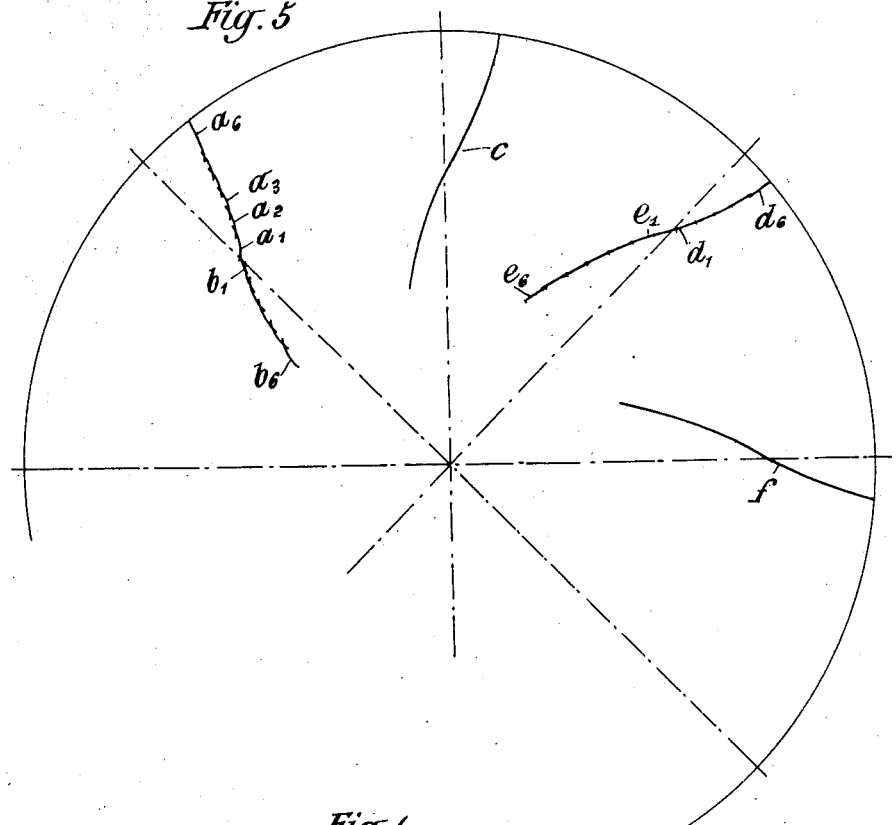
Fig. 5 shows how the curve for the radial guide grooves is composed from a plurality of partial curves.

In Figs. 1 and 2 the disc provided with the annular groove accommodating the ratchet members is indicated at 1 and the disc with the guide grooves at 2. The discs are secured on the corresponding shafts 3 and 4. Each shaft can be employed as the driving or as the driven shaft.

Arranged in the annular groove 5 in the disc 1 are the ratchet member consisting of segmentary elements 6 carrying rollers 7. Mounted on the segmentary elements 6 are pins 8 with rollers 9 for coupling the two discs together.

The radial guide grooves of the disc 2 are indicated at 10. The direction of rotation of the gearing is determined by the position of the slope of the oblique surfaces of the segmentary elements 6. The gearing shown in Fig. 1 can only be driven in clockwise direction because the roller 7 can only wedge in this direction of rotation.

In Fig. 1 the two discs are positioned eccentrically, the disc 1 being displaced in the horizontal direction with respect to the disc 2. If the disc 2 drives the disc 1 then the ratchet element 6 lying on the righthand side of the shafts 3 and 4 imparts the greatest angular speed, i. e. the transmission of power is effected by this ratchet member. If on the other hand the disc 1 drives the disc 2, then the ratchet member lying to the left of the shaft 4 imparts the greatest angular speed to the disc 2, i. e. the transmission of power is effected by means of this ratchet element. During the transmission of power the ratchet element in question remains firmly coupled with the angular groove disc, i. e., its speed is the same as that of the disc 1.

During its operative path, i. e., while it is transmitting the power, the distance of the ratchet element from the axis 4 of the disc 2 varies. If the grooves in the disc 2 did extend exactly radially, then the fluctuation in the speed of the driven disc would correspond to the alteration in the radial separation of the operative ratchet member from the axis 4 of the disc 2. When, however, the radial grooves extend obliquely and are curved as in the present invention, then the fluctuation in speed of the driven disc may be avoided because when the distance of the operative ratchet elements from the axis of the radial groove disc varies during the operative engagement of these ratchets, the obliquely positioned and curved grooves also exercise their effect. When the disc 1 is the driving disc, the ratchets are driven thereby at constant speed and in spite of the alteration in their distance from the axis of the radial groove disc during the working path, the ratchet members nevertheless drive the radial groove disc at constant speed. When the disc 2 is the driving disc, the particular configuration of the grooves prevents a reduction in the speed of the ratchet members during their period of engagement, so that the annular groove disc 1 is driven at constant speed.

In accordance with the invention, the grooves 10 of the disc 2 are positioned obliquely and curved in such manner that the auxiliary speed occasioned thereby is so great that the alterations in speed introduced by the varying radial distance of the ratchet members from the axis of the disc 2 are compensated and a substantially constant speed of the driven disc is afforded. The necessary configuration of the guide grooves to give this result will be explained with reference to Fig. 3.

If the two discs, 1 and 2, are concentric, then the radial distance of the ratchet from the axis of the disc 2 does not vary, i. e., in this case the shape of the guide groove is immaterial. In an eccentric setting only that part of the guide groove is of significance along which the ratchet member or members which are operative move in this particular setting. If in Fig. 1 it is assumed that the disc 2 is the driving disc, then starting from the central position the outer part of the guide grooves must be so constructed that the ratchet element lying to the right of the shaft 3 imparts a constant angular speed to the disc 1. If on the other hand the disc 1 drives the disc 2, then starting from the central position the inward portion of the guide grooves must be so constructed that the ratchet member lying to the left of the shaft imparts a constant angular speed to the disc 2. Preferably the guide grooves are so constructed that either the disc 1 or the disc 2 can be employed as the driving disc. This form of the guide grooves forms the basis of Fig. 1 of the drawings.

The form of the guide grooves is dependent upon the particular eccentricity, so that strictly speaking different shaped curves are required for different eccentricities. In practice, however, only relatively small parts of these different curves are required in accordance with the magnitude of the working movement of a ratchet element as expressed in degree and in accordance with the number of ratchet members which are to be operative at the same time. These individual curve sections give in combination the configuration of the radial guide grooves. To determine the form of the guide grooves, it is sufficient to determine the configuration of the curve sections for certain eccentricities and to substitute for the parts of these curves which are actually used a curve tangential thereto.

In Fig. 3 a part of the configuration of the curve is determined for that case in which the disc 2 drives the disc 1 and the eccentricity has the value $a$.

In the drawings it is assumed that the centre M of the disc 2 which is provided with the guide grooves is at a distance $a$ from the centre O of the annular groove 5. The distance $a$ is assumed to be the maximum displacement which will be desired between the axes of the two discs. If $b$ is the radius of the central line of the annular groove 5, then $a+b$ represents the greatest distance which the axes of the coupling pins can assume from the centre of the disc 2. The transmission ratio is determined by the ratio of the distances $$\frac{a+b}{b}$$

In Fig. 3 it is assumed that the transmission of power by one ratchet element is to be effected along a path which corresponds to the angle $w$. A constant speed of the driven disc 1 presupposes that this disc will then be turned through an $$\text{angle } w' = \frac{w \cdot a + b}{b}$$

corresponding to the transmission ratio. The drawings show that this cannot be attained with radial grooves. The position of the coupling pin of the ratchet element is determined by the point of intersection of the central line of the guide groove with the circle 5 of the disc 1. As seen from the drawings, an angle $w$ between the radii M11—M18 does not correspond to the angle $w'$ between the radii 18 and 19 as computed from the transmission ratio, but it corresponds to a smaller angle between the radii 11'—18. If, moreover, the angle $w$ is divided for example into seven parts corresponding to the radii 11—18, then it is further seen that parts of the angle $w$ are associated with different fractions of the angle bounded by the radii 11'—18, these fractions being determined by the radii 11'—18'. The alteration in the corresponding fractional angle shows that the speed of the driven disc initially corresponds with that of the driving disc taking account of the transmission ratio, but then the speed of the driven disc falls off.

If it is desired to obtain a constant peripheral speed of the driven disc 1, then after a rotation through an angle $w$ the coupling pin must have rotated through the angle $w'$, i. e., it must be at the point indicated at 19. Moreover corresponding fractions of the angle $w'$ must be associated with equal fractions of the angle $w$, i. e., when the coupling pin has rotated through each ⅐th of the angle $w$ the coupling pin must assume in succession the position of the points indicated at 19—26, the point 26 indicating the starting position. These positions of the coupling pin are obtained if the guide groove is given the configuration determined by the points 19 and 27—33. These points are obtained by striking arcs through the points 19—26 and making off the distances of these points from the clockwise consecutive radii 11—18 from the arc from the radius MII. By distance is meant the length of the circular arc between the point in question and the associated radius.

As seen from Fig. 3, the obliquity and curvature of the guide groove as determined by the points 19 and 27 to 33 has the result that the coupling pin is always advanced by the requisite additional amount whereby at the same time the speed of the driven disc is increased in the desired way, and in such a manner that a constant velocity is obtained.

Fig. 5 shows schematically the disc with the radial grooves. In this embodiment of the invention the disc has eight radial grooves. The straight lines shown, divide the disc in parts of equal size, and simultaneously would form the axes of the grooves, if the same were exactly radially directed. Now, for 6 different values of the eccentricity it has been found how the configuration must be, when a uniform velocity is to be obtained. The individual partial curves are denoted $a^1$—$a^6$ and $b^1$—$b^6$. The partial curves $a^1$—$a^6$ come into question when the radial disc is driving and the partial curves $b^1$—$b^6$ when the disc with the annular groove is driving. These partial curves may now be approximately replaced by a common curve. This approximatively correct curve is indicated at $c$, and when so determined and positioned as to secure the desired result, will be hereinafter referred to in the specification and claims as an "ogeeblique" curve, so that the grooves laid out in accordance with such determination will be hereinafter designated ogeeblique grooves.

Figure 4:
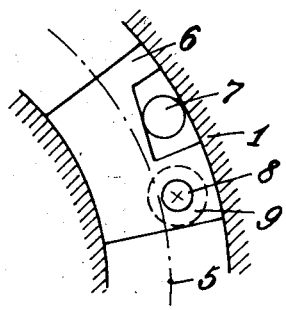
Fig. 4 shows a ratchet gear or free wheel mechanism with staggered coupling pins.

As a comparison between the partial curves and the common curve will show, some small deviations are present, because the partial curves intersect each other. A remarkable improvement may be achieved by shifting the axis of the pin 8 (Fig. 4) a little distance away from the axis of the annular groove in outward direction. The result of this shifting movement is, that the individual partial curves will more take up the form of straight lines, as also shown in Fig. 5. The corresponding partial curves are here denoted $d^1$—$d^6$ and $e^1$—$e^6$. The longitudinal common curve in this case practically coincides with the partial curves. The distance about which the axis of the pin 8 is displaced in outward direction depends upon the dimensions of the drive and is preferably determined graphically. The result of a too wide displacement would be that the partial curves are curved in a direction opposite to that of the partial curves $a^1$—$a^6$ and $b^1$—$b^6$, so that no advantage would be obtained.

Figure 6:
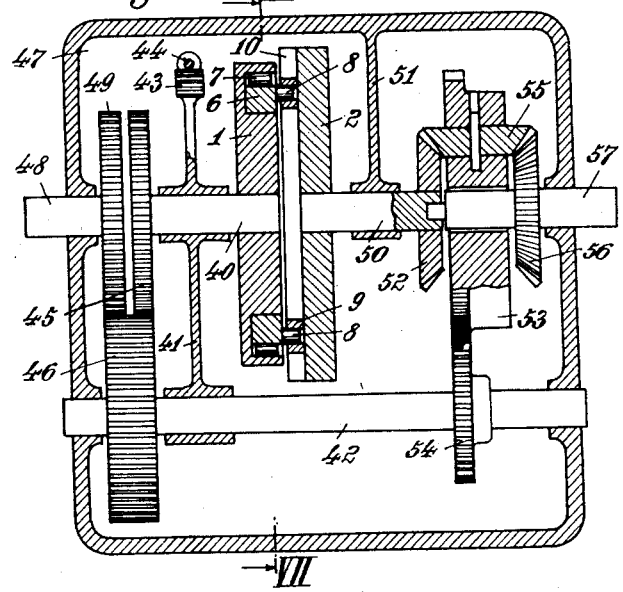
Fig. 6 is a longitudinal section through the change speed gearing which is combined with a differential gear.
Figure 7:
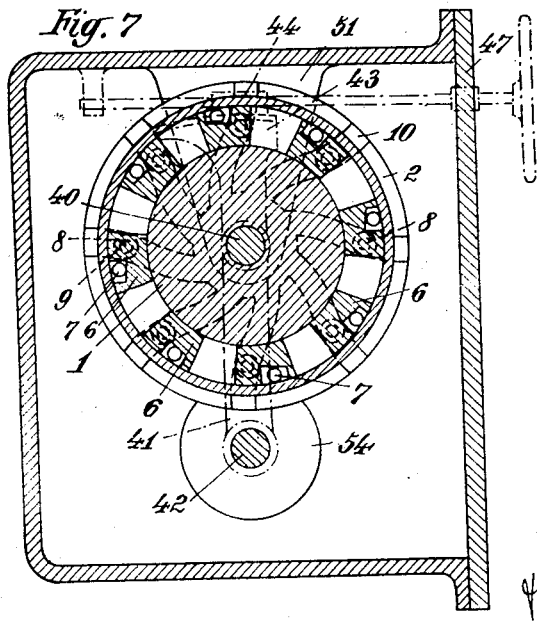
Fig. 7 is a section on the line 7—7 in Fig. 6.

In the change speed gear according to Figs. 6 and 7 the discs of the gear are as before indicated by 1 and 2, 1 being the disc with the annular groove accommodating the ratchet members and 2 the disc with the ogeeblique grooves. The ratchet members consist of segmentary elements 6 with wedge-shaped recesses accommodating bolts 7. Provided on the segmentary elements 6 are pins 8 carrying rollers 9. These rollers engage in the ogeeblique grooves 10 of the star wheel.

The disc 1 is carried on a shaft 40. This shaft is journalled in an adjustable lever 41. The adjustable lever 41 is pivotally mounted on the driving shaft 42 and at its upper end the segment 43 of a worm wheel is secured which is driven by a worm 44. In this way the disc 1 is pivoted about the shaft 42.

The shaft 40 is driven by way of the pair of spur wheels 45, 46. In the present case the shaft 42 is not driven directly but by way of a layshaft 48 mounted in the housing 47 and the spur wheel 49 of which also engages in the spur wheel 46 secured on the shaft 42.

Connected with the driven disc 2 is a differential gearing. The disc 2 is carried on a shaft 50 which is journalled in a bearing 51 secured to the housing 47. The sun wheel 52 of the differential is also connected to the shaft 50. The spur wheel 53 of the differential is driven by means of a spur wheel 54 which is secured on the shaft 42. The planet wheel 55 is rotatably mounted on the spur wheel 53. This planet wheel is in engagement with the driven sun wheel 56 which is secured on the driven shaft 57.

The transmission ratio of the spur wheels 45, 46 on the one hand and of the wheels 53, 54 on the other hand can be so arranged that when the discs 1 and 2 are concentric the speed of the driven shaft 57 is zero. On relative displacement of the discs 1 and 2 by pivoting the adjustable lever 41 the speed of the driven shaft 57 can be altered up to the desired maximum value.

I claim:

1. In a variable speed transmission mechanism, a pair of rotatable members, means for displacing said members to positions of varying eccentricity, one of said members having an annular guide, a plurality of guide engaging members retained by said guide, the other of said members having a plurality of ogeeblique guides to cooperate with said guide engaging members to transmit rotation from one of said members to the other, each of said ogeeblique guides being so positioned and especially designed as to retard or accelerate the guide engaging members sufficiently to cause a plurality of said guide engaging members to be in driving engagement simultaneously and to transmit a smooth and uniform rotation to the driven member.

2. In a variable speed transmission mechanism, the combination of a pair of rotatable members adapted to be displaced with respect to each other into positions of varying eccentricity, means for so displacing said members, one of said rotatable members having an annular groove therein, a plurality of ratchet members displaceable in said annular groove, said other rotatable member having a plurality of ogeeblique grooves therein adapted to be engaged by said ratchet members to transmit rotation of one of said members to the other, said driven member being rotated at substantially constant, smooth, uniform speed.

3. In a variable speed transmission mechanism, the combination comprising a pair of rotatable members adapted to be displaced with respect to each other into positions of varying eccentricity, means for so displacing said members, one of said rotatable members having an annular groove therein, a plurality of ratchet members displaceable in said annular groove, said ratchet members being journaled on axes which are located radially outwardly from the center line of said annular grooves, said other rotatable member having a plurality of ogeeblique grooves therein adapted to be engaged by said ratchet members to transmit rotation of one of said rotatable members to the other, said ogeeblique grooves modifying the speed of the ratchet members sufficiently to compensate for the variations in speed introduced by the varying radial distance of the ratchet members from the axis of the second rotatable member whereby a substantially constant, smooth, uniform speed of the driven member is obtained.

FRIEDRICH CAVALLO.